Oct. 27, 1931.  P. A. H. MOSSAY  1,828,905
MOTOR PROPELLED CRANE
Filed March 3, 1927  9 Sheets-Sheet 1

Oct. 27, 1931. P. A. H. MOSSAY 1,828,905
MOTOR PROPELLED CRANE
Filed March 3, 1927 9 Sheets-Sheet 2

Oct. 27, 1931.  P. A. H. MOSSAY  1,828,905
MOTOR PROPELLED CRANE
Filed March 3, 1927   9 Sheets-Sheet 6

Oct. 27, 1931.  P. A. H. MOSSAY  1,828,905
MOTOR PROPELLED CRANE
Filed March 3, 1927   9 Sheets-Sheet 7

Patented Oct. 27, 1931

1,828,905

UNITED STATES PATENT OFFICE

PAUL ALPHONSE HUBERT MOSSAY, OF IPSWICH, ENGLAND, ASSIGNOR TO MOSSAY & COMPANY, LIMITED, OF LONDON, ENGLAND, A CORPORATION

MOTOR PROPELLED CRANE

Application filed March 3, 1927, Serial No. 172,481, and in Great Britain March 8, 1926.

This invention relates to railless motor propelled cranes which are provided with ground wheels adapted to act both for translational movements and for slewing movements of the crane thereon.

In previous cranes of this type the ground wheels have been used for moving the crane in a direction along the horizontal projection of the jib, steering to the right or left about that direction and slewing on a center within the wheel base.

The object of this invention is to enable the ground wheels to be used in addition for moving the crane in direction at right angle to the horizontal projection of the jib and steering to the right or left about that direction.

In order to meet all these requirements some of the ground wheels are adapted to be set or adjusted independently of the other or others.

A separate hand steering wheel may be provided to effect these independent adjustments, or a single hand steering wheel may be used with suitable means for operatively connecting it to either set of wheels.

The invention may be applied to a crane having a wheel base of fixed dimensions or to one having an extensible wheel base, namely one which can be varied so as to vary the co-efficient of stability of the crane, for instance as described in the specification of my co-pending application 172,482 filed March 3, 1927.

Several forms of cranes according to the invention are illustrated by way of examples in the accompanying drawings wherein similar reference numerals throughout the figures indicate corresponding parts.

In the form of crane illustrated in Figures 1 to 6, a carriage 1 built for instance of steel plates and angles is provided with forward wheels 3, 3 and a rear wheel 5.

Figure 6:
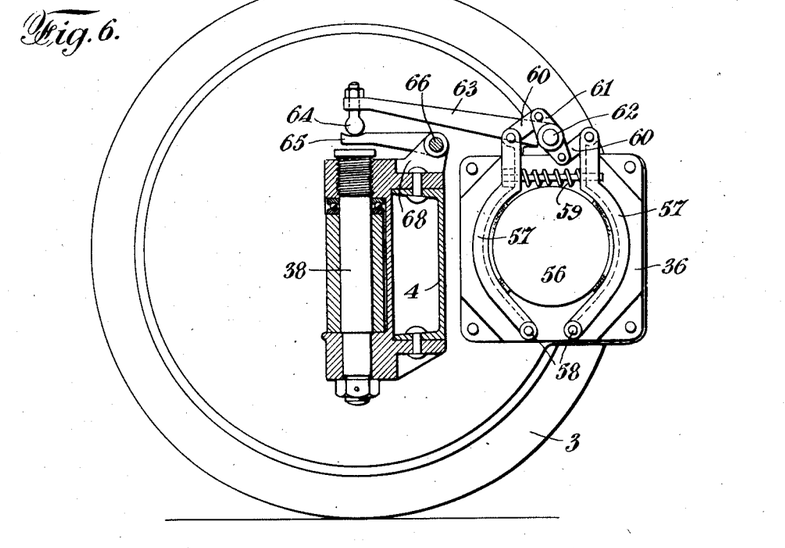
Figure 7:
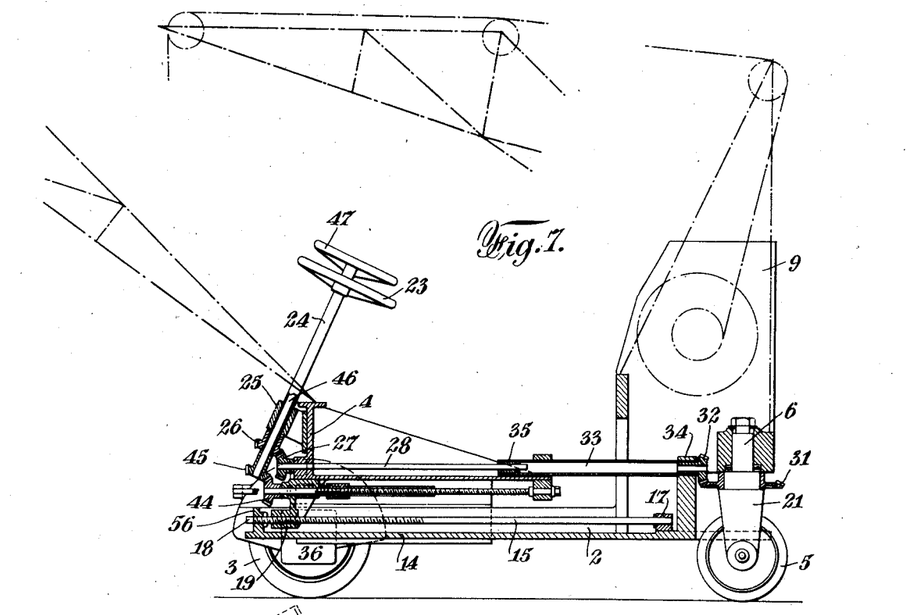
Figures 7, 8 and 9, are respectively, a side sectional view, a plan and a front view of another form having an extensible wheel base.
Figure 8:
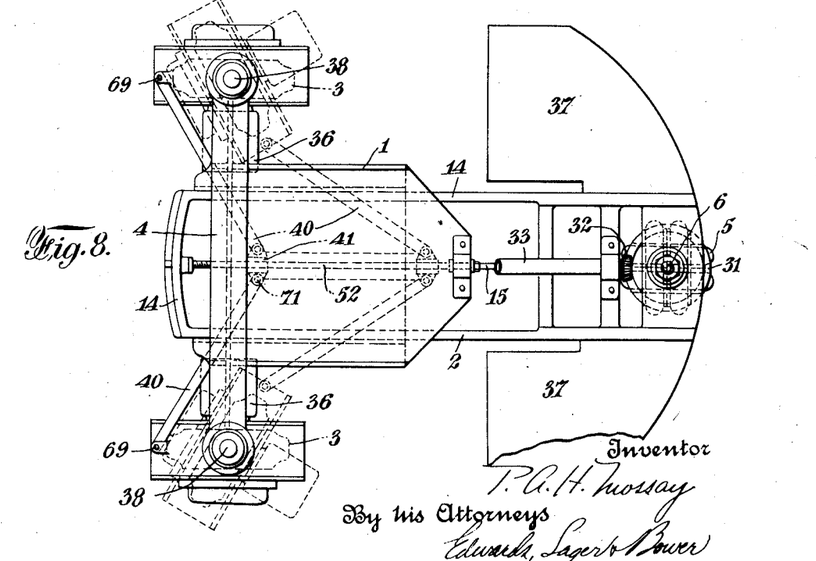
Figure 9:
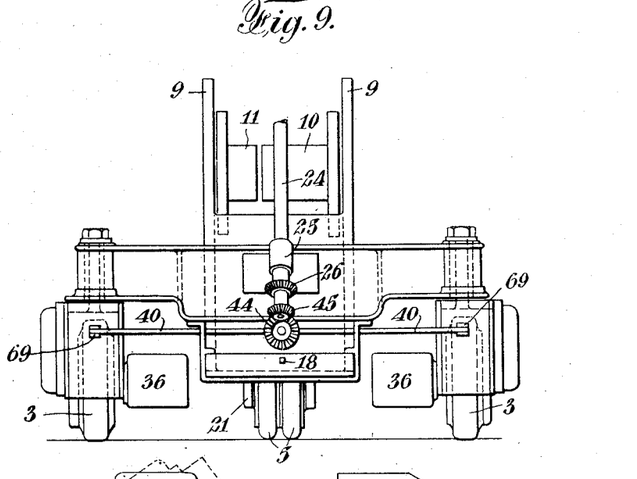
Figure 10:
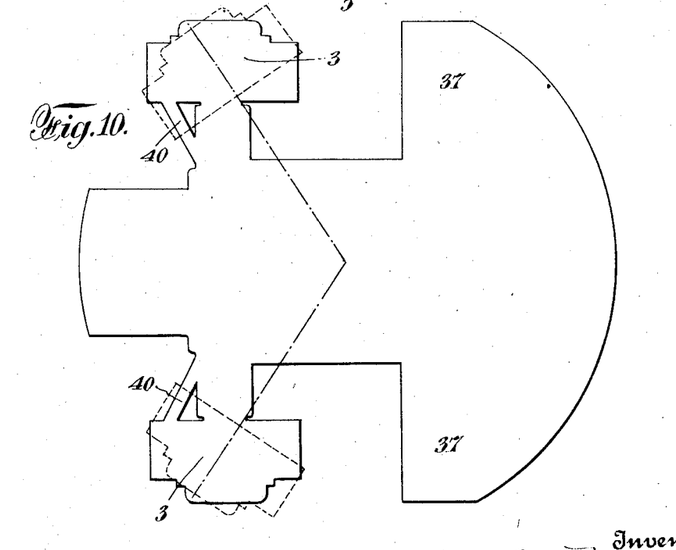
Figure 10 is a diagram or outline plan of the Figs. 7–9 form of crane after adjustment for a minimum turning or slewing radius.

The wheels 3, 3 are mounted on stub axles 53, Figure 6, which are adapted to swing about vertical axles 38 mounted in the forked ends of a fixed axle 4.

The wheel 5, shown as a twin wheel, is mounted in a fork 21 adapted to swivel about a vertical axle 6 mounted in a bearing on the rear of the carriage.

The wheels 3, 3 are driven wheels, electric motors 36, 36, for example being provided for this purpose. Each motor drives its adjacent wheel 3 through a toothed pinion 54 and an internal toothed wheel 55 on the wheel 3, Figure 5. Suitable means not shown are provided for controlling these motors so that they can be driven in the same or in opposite directions, for instance, as described in the specification of my co-pending application, Serial No. 491,099 according to the movements to be made by the crane.

Links 40 are pivotally connected by bolts 69 to lugs 70 cast on or secured to the motor plates 39. The links 40 are pivotally connected at their other ends by bolts 71 to lugs 72 on a nut 41 on a hollow, screw-threaded shaft 52 which is mounted at one end in a bearing 42 on the axle 4 and at the other end in a bearing 43 on the carriage 1. The shaft 52 is rotated in one direction or another as required by a hand steering wheel 47, a steering column 46 and bevel wheels 45, 44.

It will be noticed from an inspection of Figure 2 that the axle 4 is cranked at its ends so that ample clearance is provided to allow the wheels 3, 3, to be moved from the position indicated in full lines, i. e. parallel to the fore and aft axis of the crane through 90° to a position in which the wheels are at right angles to said fore and aft axis, or even to a position beyond this as indicated in dotted lines, for purposes hereinafter apparent. The cross section of the axle 4 with its cranked ends may be of the form shown in either Figures 1 and 2 or 5 and 6.

Figure 5:
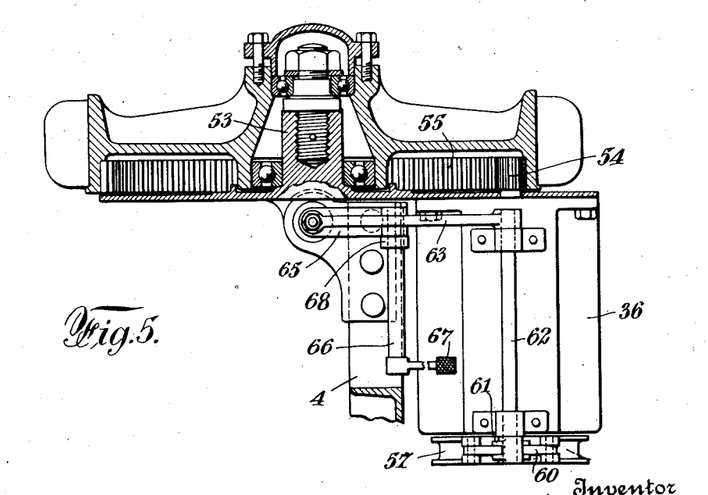
Figures 5 and 6 are, respectively, a sectional plan and a side sectional view illustrating one of the driven wheels with its motor, transmission gear and brake.

Each motor 36 is provided with a suitable brake; for example a brake drum 56, Figures 5 and 6, is mounted on each motor shaft and provided with two brake levers 57, 57, pivoted at 58, 58. A spring 59 tends to force the levers 57 apart. They are drawn towards one another, to apply the brake, by links 60 connected to a lever 61 mounted on a shaft 62. A lever 63 on the shaft 62 has a ball 64 at its end resting on a lever 65 which is mounted on a shaft 66 operable by a pedal 67. The shaft 66 is carried in bearings 68 on the axle 4 and extends across the machine so that it operates the brakes on both motors simultaneously. The balls 64 are situated exactly on the axes of the corresponding vertical axles 38 so that they remain in operative engagement with the levers 65 in all positions of the wheels 3, 3.

The fork 21 of the wheel 5 is provided with a bevel wheel 31 which meshes with a bevel wheel 32 on a shaft 33 carried at one end, in a bearing 34 on the carriage 1. The shaft 33 passes through the hollow shaft 52 and at its forward end has a bevel wheel 27 meshing with a bevel wheel 26 on a steering column 24 provided with a hand steering wheel 23.

The steering columns 24 and 46 are supported by a bearing bracket 25 mounted on the axle 4, the bracket also forming a bearing 29 for the hollow shaft 52.

It is assumed, that, in the example above described, the carriage 1 is provided with a jib in fixed relation to the carriage and with hoisting and luffing gear either hand or power operated, for instance, a jib 8 indicated diagrammatically is assumed to be pivoted on a derrick or framework 7, and winches 10 and 11 are supported between side cheeks 9 erected on the carriage. These parts are well known in the art and need no further description. Similarly, accumulators or petrol electric plant for the supply of current for the motors 36 and motors for the winches 10, 11 may be mounted on platforms or boxes 37, or these platforms or boxes may be used to hold ballast.

By appropriate manipulation of the hand wheels 23 and 47 the wheels 3, 3 and 5 can be set in a variety of different relative positions to effect various movements or evolutions of the crane as follows:—

Figure 4:
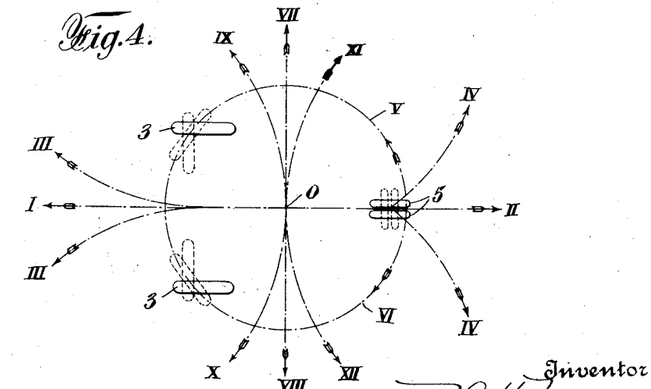
Figure 4 is a diagram illustrating the various movements the Figs. 1–3 form is capable of making on its ground wheels.

(a) The wheels 3, 3 and 5 set parallel to one another as in full lines in Figure 4 the crane making straight fore and aft movements as indicated by the arrows I and II.

(b) The wheels 3, 3 in the positions indicated in full lines in Figure 4 and the wheel 5 oscillated to effect ordinary fore and aft steering movements of the crane for instance as indicated by the arrows III and IV.

(c) The wheels 3, 3 and 5 set with their axes radial to a common planetary centre 0, the crane making rotary or slewing movements about said centre as indicated by arrows V and VI.

(d) The wheels 3, 3 and 5 set parallel to one another but at right angles to the fore and aft axis of the crane, which can then make straight movements in the directions of the arrows VII and VIII i. e. traversing movements.

(e) The wheels 3, 3 and 5 set with their axes radial to a centre beyond the wheel base, so that the crane moves in directions indicated by the arrows IX and X; similar adjustments also affording movements in the directions indicated by the arrows XI and XII.

The invention may be applied to a crane having an extensible wheel base of the kind set forth in the specification of my application Serial No. 151,505 an example of such an application being shown in Figures 7 to 10, but no claim per se to this feature of an extensible base is made herein.

In these figures the carriage comprises two units 1 and 2. The unit 1 has the fixed axle 4 for the wheels 3, 3 and the unit 2 has the wheel 5.

The unit 2 has an extension 14 supported on the axle 4 and adapted to slide thereon, to vary the distance between the wheels 3, 3 and 5, under the influence of a screw-threaded shaft 15 carried at one end in a bearing 17 on the unit 2 and at the other end in a bearing 56 in the front end of the extension 14. The shaft 15 engages with a nut 19 on the axle 4 and has a squared end 18 for a handle or key by which it can be rotated as and for the purposes explained in the specification above mentioned.

In order to permit of these variations and yet to maintain operative connection between the hand steering wheel 23 and the wheel 5, the bevel wheel 27 is mounted on a squared shaft 28 which fits but slides in a square hole in a socket 35 in the end of a tubular shaft 33 on which the bevel wheel 32 is mounted.

Figure 11:
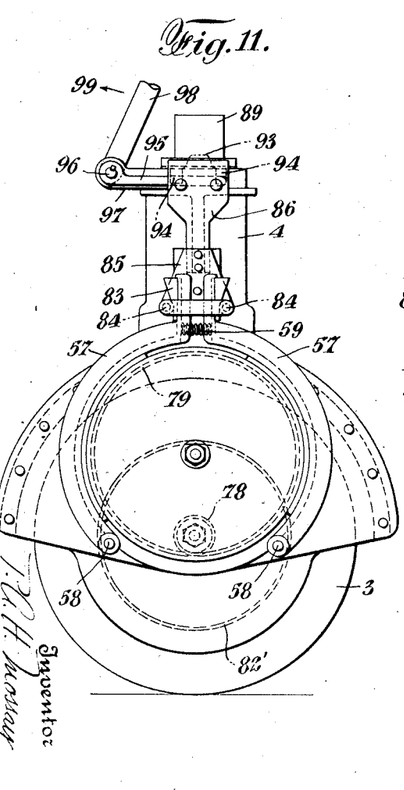
Figures 11 and 12, are, respectively, a side view and a front sectional view illustrating one of the driven wheels of the Figs. 7–9 form with its motor transmission gear and brake.
Figure 12:
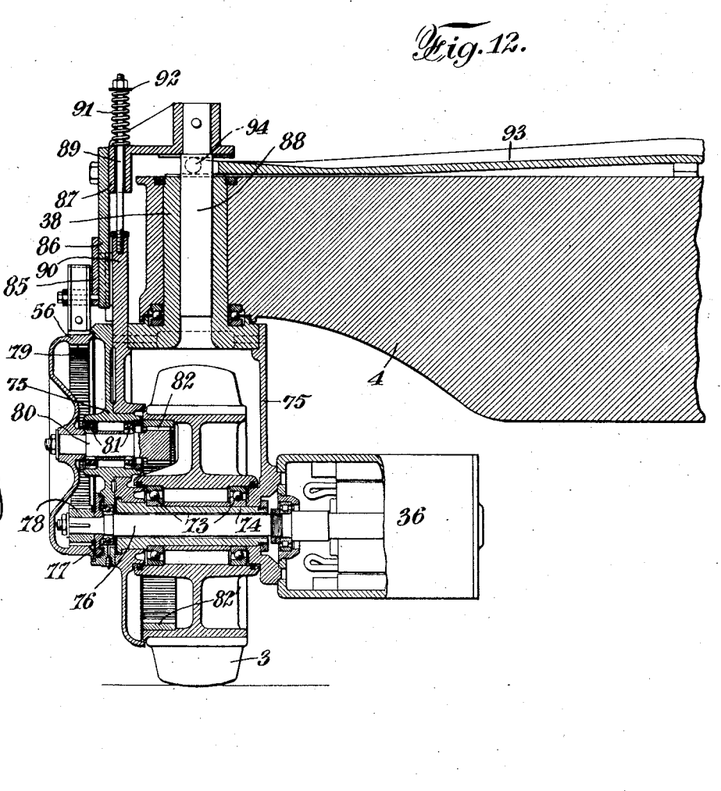

In this form of the crane the wheels 3, 3 are adapted to be swivelled or adjusted for similar purposes and by similar mechanism to that hereinbefore described with reference to Figures 1 to 4, but the wheels 3, 3 are adapted to swivel on vertical axles 38 which are forked to receive them. The details of the mountings of these wheels are shown in Figures 11 and 12. Each wheel 3 is mounted on ball bearings 73, 73, on a sleeve 74 fixed at its ends in the side plates 75, 75, or prongs of a forked axle 38, the upper part or axle proper being mounted to rotate in the adjacent end of the fixed axle 4 of the crane. A motor 36 is mounted on one side plate 75. The motor shaft 76 passes freely through the sleeve 74, its outer end being carried in a ball bearing 77 on the other side plate 75. A toothed pinion 78 on the shaft 76 meshes with an internally toothed wheel 79 fixed on a short shaft 80 which is carried in ball bearings 81, in the adjacent side plate 75. A pinion 82 on the inner end of the shaft 80 meshes with internal teeth 82' on the rim of the wheel 3. The outer rim of the wheel 79 forms a brake drum 56 with which engage two brake levers 57, 57, which are pivoted at 58, 58, and normally held in the off position by a spring 59. The upper ends of the levers 57, 57 are provided with cams 83, 83. Rollers 84, 84, for engagement with the cams 83, 83 are carried by a plate 85 fixed to a plate 86 which is fixed to a bracket 87 fixed to the upper end of a pin 88 which slides vertically in the interior of the hollow vertical axle 38. A rod 89 is screwed into an upward extension 90 of the adjacent side plate 75. A coiled spring 91 on the rod 89 abuts against a washer 92 at one end, and at the other end against the bracket 87 and tends to force it down so that the rollers 84, 84, are moved down the cams 83, 83 to release the brake levers 57, 57.

A bar 93 extends along the top of the fixed axle 4 of the crane and has a fork 94 at each end engaging with the underside of the adjacent bracket 87. A lever 95 is mounted on a shaft 96 which is carried in bearings 97 which are fixed to the fixed axle 4. The lever 95 engages with the underside of the bar 93 at its centre. An operating crank 98 is mounted on the shaft 96. When this crank is moved in the direction of the arrow 99, for instance by a pedal (not shown) suitably connected to the crank, the bar 93 is raised and consequently raises the brackets 87 so that the rollers 84, 84, are moved up the cams 83, 83, and the brake levers 57, 57 are applied to the brake drums 56, 56.

Figure 13:
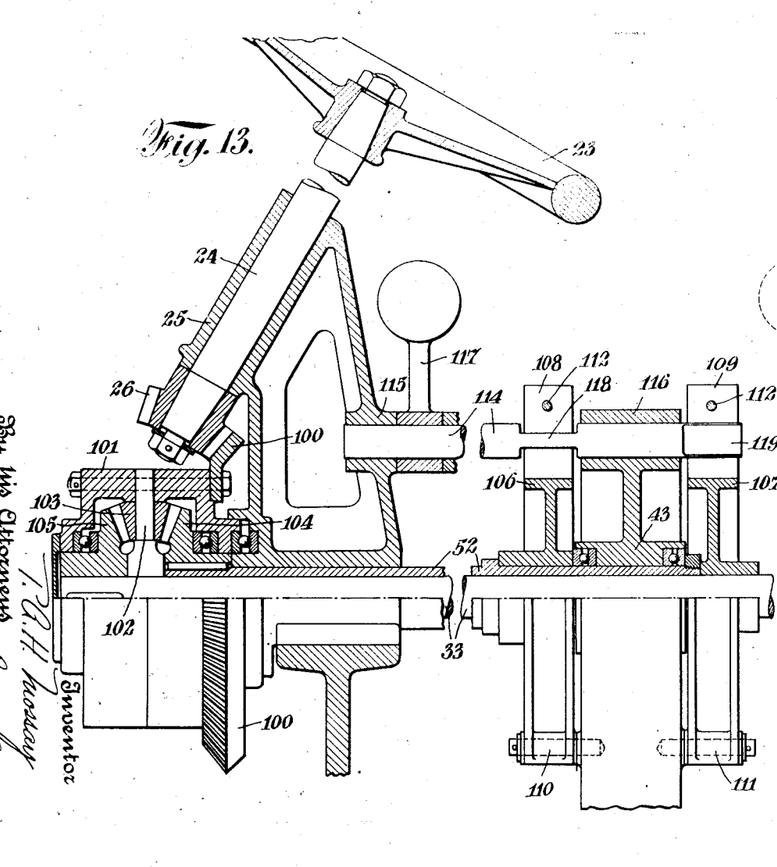
Figure 13 is a side sectional view illustrating an alternative form of mechanism whereby one hand steering wheel is adapted to control the adjustment of both sets of ground wheels.
Figure 14:
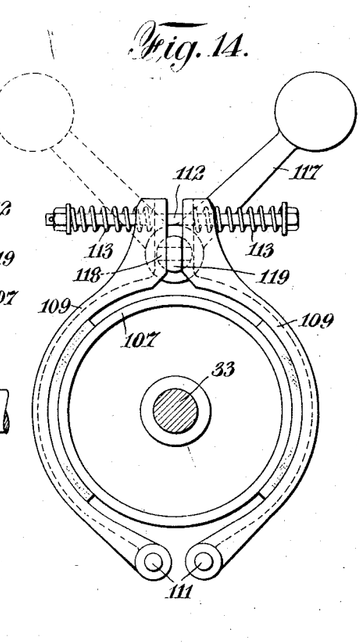
Figure 14 is an end view of part of the Fig. 13 mechanism.

Figures 13 and 14 illustrate differential mechanism by which it is possible to effect independent adjustments of the two sets of ground wheels from a single hand steering wheel.

Figure 1:
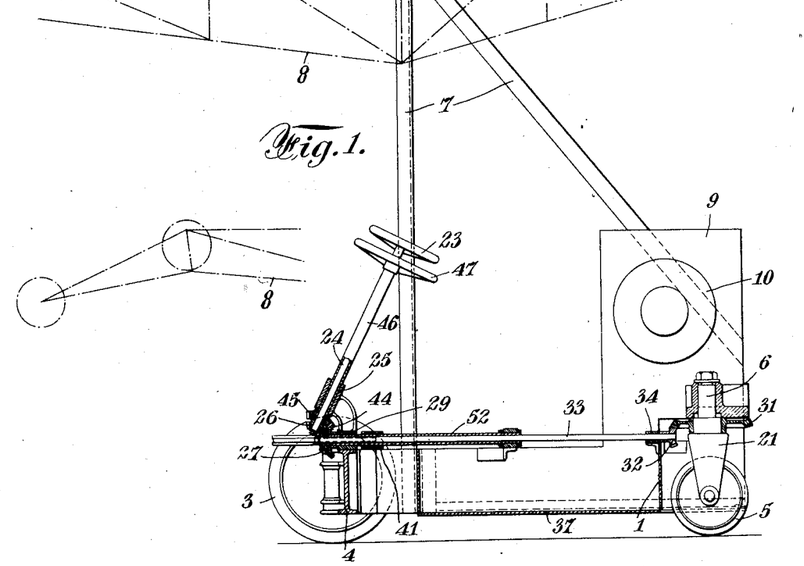
Figures 1, 2 and 3 are respectively a side sectional view, a plan and a front view of one form.
Figure 2:
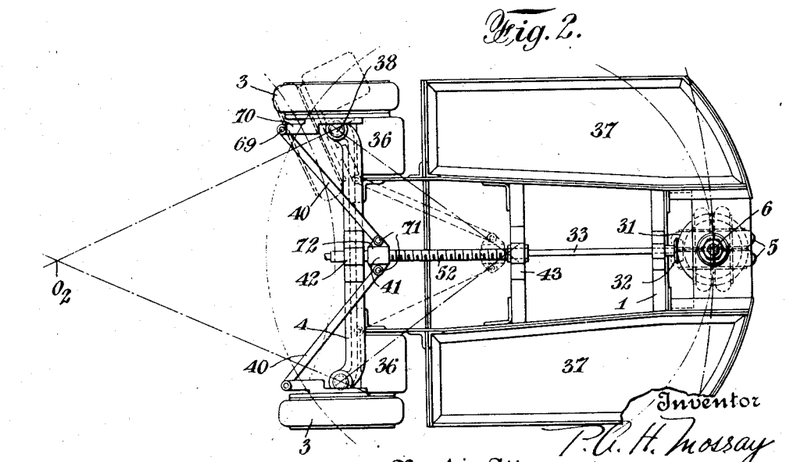
Figure 3:
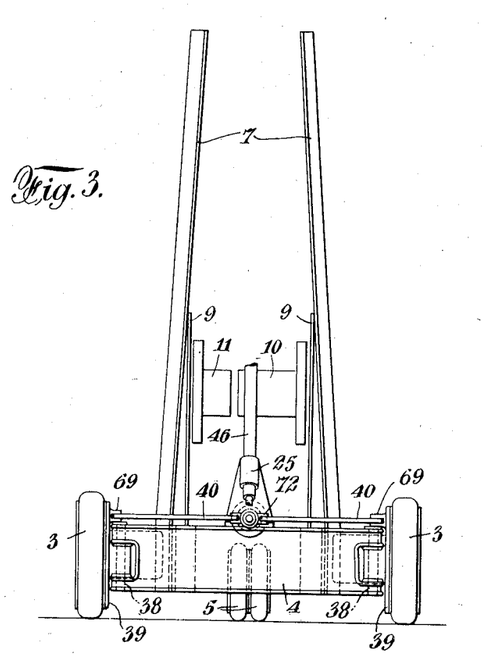

In these figures 52 and 33 represent shafts corresponding to those similarly indicated in Figures 1 and 2, and are intended for the same purposes as those shafts.

A single hand steering wheel 23 is fixed on a steering column 24 carried in a bracket bearing 25. A bevel pinion 26, on the column 24 meshes with a bevel wheel 100 which is bolted to a revolving cage 101, which carries one or more pins 102 on which bevel pinions 103 are mounted so that they can rotate freely thereon. The pinions 103 mesh with bevel wheels 104, 105, keyed respectively to the shafts 52 and 33. The shafts 52 and 33 are provided respectively with brake drums 106, 107, which are provided respectively with pairs of brake levers 108, 109, pivoted at 110 and 111 to the bearing 43. Each pair of brake levers is provided with a bolt 112 passing freely through holes in the upper ends of the levers and provided with coiled springs 113 which tend to hold the brake levers in engagement with their respective brake drums. A rod 114 is mounted in bearings 115 and 116 so that it can oscillate therein accordingly as a weighted lever 117 is thrown over to one side or the other. The rod 114 has two flat portions 118, 119 which are at right angles to one another and engage respectively with the pairs of brake levers 108, 109.

When the weighted lever 117 is in the position indicated in full lines in Figure 14 the flat portion 118 is horizontal and holds the levers 108 apart sufficiently to release the drum 106, whereas the portion 119 is vertical, so that the levers 109 are forced together by their springs 113 sufficiently to engage with the drum 107. In these circumstances the shaft 52 can be rotated by the hand wheel 23 and the shaft 33 is stationary. When the weighted lever 117 is thrown over to the dotted position the converse occurs, namely the drum 107 is released and the brake applied to the drum 106. In these circumstances the shaft 33 can be rotated by the hand wheel 23 and the shaft 52 is stationary.

Figure 16:
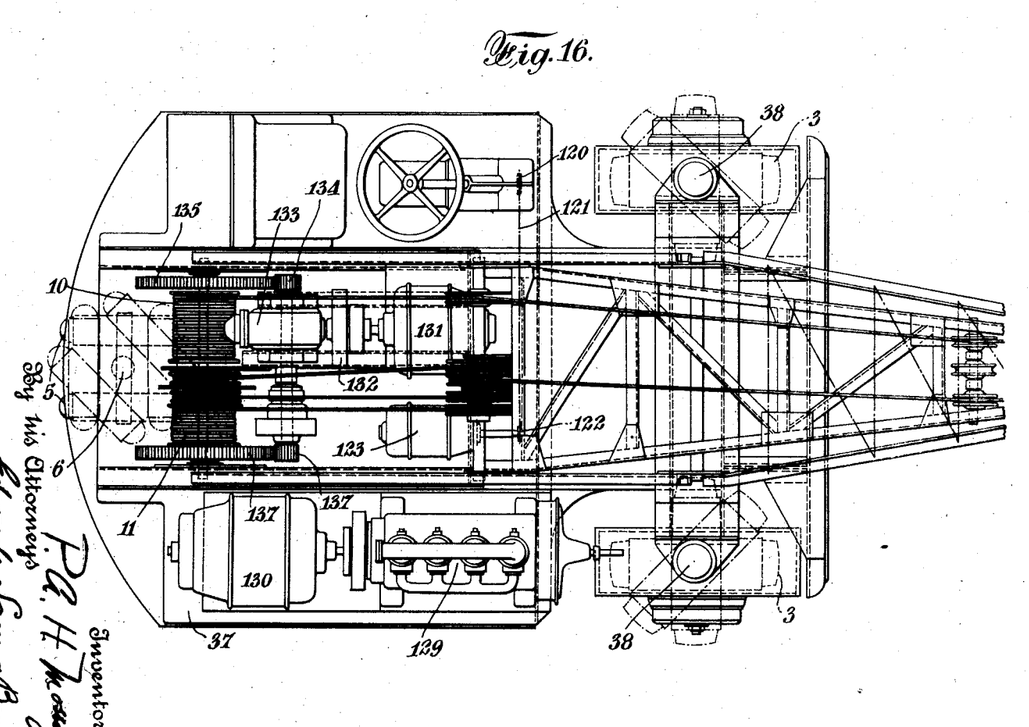

If desired a servo motor may be provided to effect the necessary rotations of the shafts 52 and 33, for example, the cage 101 may be provided with a sprocket wheel 120 adapted to be driven by a chain 121 off a sprocket pinion 122 on the shaft of the servo motor 123 indicated in Figure 16.

Figure 15:
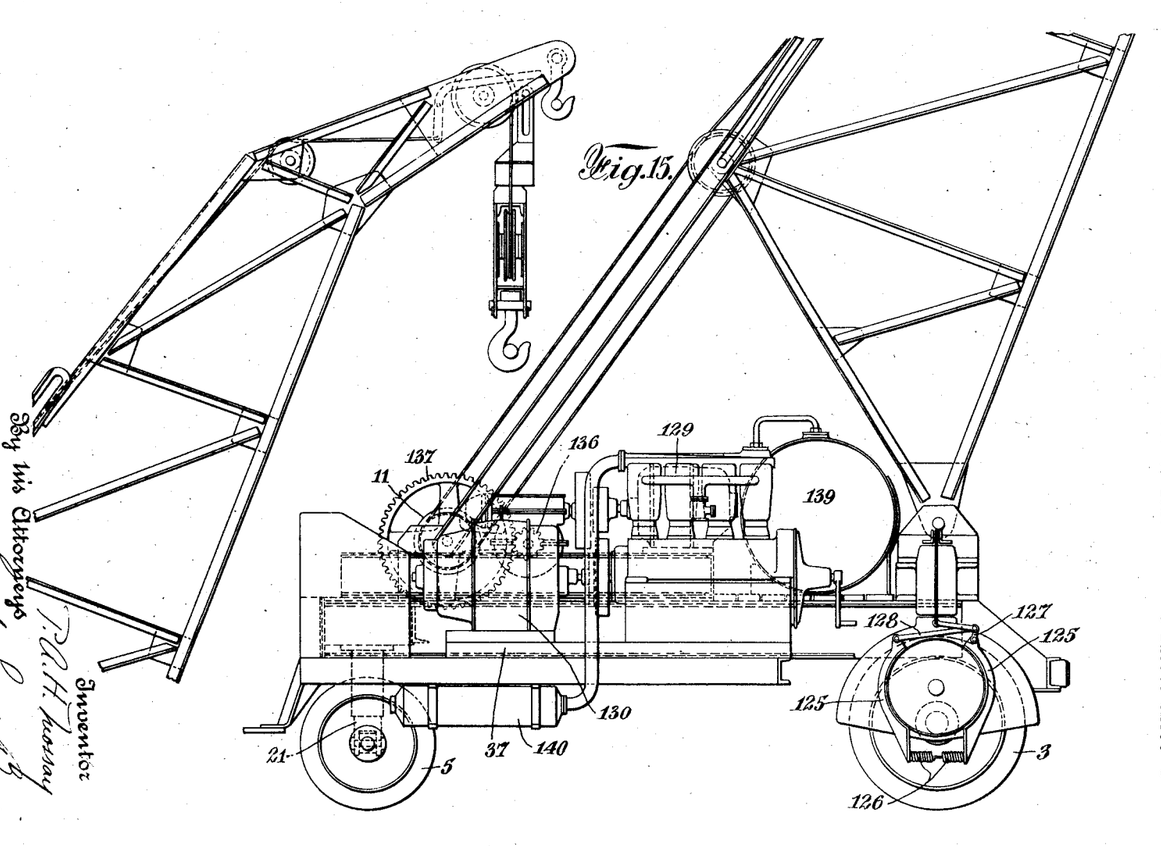
Figures 15 and 16 are respectively an elevation and plan of one form of crane similar to that shown in Figures 1 and 2 but provided with petrol electric transmission.

Figures 15 and 16 show a crane with a non-extensible base with front wheels 3, 3 mounted and driven in the manner hereinbefore described with reference to Figures 11 and 12 but a conventional form of brake mechanism is indicated somewhat diagrammatically in Figure 15 comprising two brake levers 125 drawn together at their lower ends by springs 126, and adapted to be drawn together or forced apart at their upper ends by a bell-crank lever 127 and a rod 128 accordingly as the lever 127 is forced up or down by suitable means not shown. The wheels 3. 3 are moved about their vertical axes 38, and the wheel 5 is moved about its vertical axis 6 by mechanism similar to that hereinbefore described with reference to Figures 1 and 2 except that the two shafts 52 and 33 of those figures are in the present case assumed to be operated from a single hand wheel through mechanism such as described with reference to Figures 13 and 14. These details are omitted from Figures 15 and 16 to avoid confusion as these figures are given more for the purpose of showing how the adjustable wheel system, forming the essential feature of the invention can be applied to a crane provided with petrol electric power plant. 129 indicates a conventional petrol engine provided with a cooling water tank 139 and exhaust silencer 140. The petrol engine 129 is in driving connection with an electric generator 130 which is mounted on a platform 37 for supplying current to a motor 131 connected by a clutch 132 to a worm reduction gear contained in a casing 133 for driving the hoisting winch 10 through a spur pinion 134 and toothed wheel 135 and the luffing winch 11 through a spur pinion 136 and toothed wheel 137, suitable clutches being provided to enable the winches to be thrown into and out of operation as required.

In a further modification the front wheels (3) (3) need not be driven wheels the rear wheel (5) only being a driven wheel, for instance it may be provided with driving gear such as described with reference to Figures 11 and 12.

I claim:—

1. In a railless motor propelled crane, a carriage, a plurality of ground wheels having substantially horizontal axes, means supporting said carriage from said wheels and permitting the latter to swivel about axes substantially vertical to and substantially intersecting said horizontal axes, and a steering control mechanism including hand operated connections to said supporting means adapted to move said ground wheels around said vertical axes into a predetermined angular relation to each other for straight translational movements of said carriage or into a different angular relation to each other for curvilinear slewing movements of said carriage or into a still different angular relation to each other for traverse movements of said carriage at right angles to said first mentioned translational movements thereof.

2. In a railless motor propelled crane, a carriage, a plurality of sets of ground wheels, means supporting said carriage from said wheels and permitting the latter to swivel about substantially vertical axes, the intersection of said axes with a horizontal plane passing through the apexes of a polygon within which passes the vertical line through the center of gravity of the crane, and a steering control mechanism including hand operated connections to said supporting means adapted to move said sets of ground wheels around said vertical axes either into position for straight translational movement of said carriage or into position for curvilinear slewing movement of said carriage or into position for traverse movement of said carriage at right angles to said first mentioned translational movement thereof.

3. In a railless motor propelled crane, a horizontally adjustable carriage of two sections, a set of ground wheels, means supporting each of said sections from said wheels and permitting the latter to swivel about substantially vertical axes, means for adjusting said sections to increase or decrease the distance of said sets of ground wheels from each other as desired, and an adjustable steering control mechanism adjustable with said sections and including hand operated connections to said supporting means for moving said sets of ground wheels independently of each other and for setting them for straight translational movements of said carriage and curvilinear slewing movements of said carriage centers situated within or without said carriage as desired, and also for movements of said carriage at right angles to said first mentioned translational movements thereof.

4. A crane, comprising in combination, a mobile member, material-lifting devices thereon, three wheel-elements carrying said member, said elements being disposed in general triangular formation to provide a three-point support, two of said wheel-elements being arranged in a pair at opposite sides of said member, means affording variable setting movements of said pair in opposite directions, and means for locking said pair in set positions, said locking means being independent of the third wheel-element.

5. A crane, comprising in combination, a mobile member, material-lifting devices thereon, three wheel elements carrying said member, said elements being disposed in formation to provide a three-point support, two of said wheel-elements being arranged in a pair at opposite sides of said member, means affording variable setting movements of said pair in opposite directions, means for affording setting movements of the third wheel-element to variable positions, and means for locking said third wheel-element when set.

6. A crane, comprising in combination a mobile member, material-lifting devices thereon, three wheel-elements carrying said member and arranged to provide a three-point support therefor, two of said wheel-elements being paired, means affording variable setting movements of said pair, means for locking said pair in set position, means for affording setting movements of said third wheel-element, and means for locking the third wheel element when set, the two locking means being controlled by a single hand-piece.

7. A crane, comprising in combination a mobile member, material-lifting devices thereon, wheel-elements carrying said member, said elements arranged in general triangular formation to provide a three-point support, two of said wheel elements being arranged in a pair at opposite sides of said member, means affording variable setting movements of certain only of said wheel-elements, means for locking said last recited wheel-elements, means for affording setting movements of certain other of said wheel-elements to variable positions, and locking means therefor, the two locking means being alternatively effective 8. In a railless motor propelled crane, a carriage, a plurality of ground wheels having substantially horizontal axes supporting said carriage and adapted to swivel about axes substantially vertical to and substantially intersecting said horizontal axes, said wheels being spaced in triangular formation with the driving wheels located between the center of gravity of the crane and the center of gravity of the load, a pair of said ground wheels in all swivelling positions being maintained in equal and opposite angular relationships to the longitudinal axis of the crane and a steering control mechanism capable of moving independently and successively said ground wheels into predetermined angular relation to each other for moving said carriage about a center located at any point on two ground lines, one passing through the vertical axes supporting the driving wheels and the other passing through the third vertical axis and perpendicular to the first line.

9. In a railless motor propeller crane, a carriage, a set of three ground wheels including a pair of driving wheels, all of said wheels having substantially horizontal axes, means supporting said carriage from said wheels and adapted to swivel about axes substantially vertical to and substantially intersecting said horizontal axes, said wheels being spaced in triangular formation with the pair of driving wheels located between the center of gravity of the crane and the center of gravity of the load, steering control mechanism capable of moving said ground wheels into predetermined angular relation and means for maintaining a constant loading of the pair of driving wheels for a given moment of load irrespective of the position of the center of movement of all wheels located at any point on two ground lines, one passing through the vertical axes supporting the driving wheels and the other passing through the third vertical axis and perpendicular to the first line.

10. In a railless motor propelled crane, a carriage, a set of three ground wheels including a pair of driving wheels, all of said wheels having substantially horizontal axes, means supporting said carriage from said wheels and adapted to swivel about axes substantially vertical to and substantially intersecting said horizontal axes, said wheels being spaced in triangular formation with the pair of driving wheels located between the center of gravity of the crane and the center of gravity of the load, steering control mechanism capable of moving said ground wheels into predetermined angular relation, and means for maintaining a loading of the pair of driving road wheels proportionate to the moment of the load irrespective of the position of the center of movement of all wheels located at any point on two ground lines, one passing through the vertical axes supporting the driving wheels and the other passing through the third vertical axis and perpendicular to the first line.

11. In a railless motor propelled crane, a carriage, a plurality of ground wheels having substantially horizontal axes, means supporting said carriage from said wheel and adapted to swivel about axes substantially vertical to and substantially intersecting said horizontal axes, said wheels being spaced in triangular formation with the driving wheels located between the center of gravity of the crane and the center of gravity of the load, and in all swivelling positions being maintained in equal angular relationships to the longitudinal axis of the crane, and a steering control mechanism including hand actuated devices capable of moving said ground wheels into predetermined angular relation to each other for moving said carriage about a center coincident with the swivelling center of the rear wheel.

12. In a railless motor propelled crane, a carriage, a plurality of ground wheels having substantially horizontal axes, means supporting said carriage from said wheels and adapted to swivel about axes substantially vertical to and substantially intersecting said horizontal axes, said wheels being spaced in triangular formation with the driving wheels located between the center of gravity of the crane and the center of gravity of the load, and in all swivelling positions being maintained in equal angular relationships to the longitudinal axis of the crane, and a steering control mechanism including hand-actuated devices capable of moving said ground wheels into predetermined angular relation to each other for moving said carriage about a center located in the vertical plane passing through the crane-hook whatever the position of said center in said plane.

PAUL ALPHONSE HUBERT MOSSAY.